United States Patent
Chon (10) Patent No.: US 10,502,819 B2
(45) Date of Patent: Dec. 10, 2019

(54) SYSTEMS AND METHODS FOR ALIGNING AN INERTIAL MEASUREMENT UNIT IN A VEHICLE

(71) Applicant: GM GLOBAL TECHNOLOGY OPERATIONS LLC, Detroit, MI (US)

(72) Inventor: Jaechoon Chon, Albany, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 121 days.

(21) Appl. No.: 15/851,118

(22) Filed: Dec. 21, 2017

(65) Prior Publication Data

US 2018/0113204 A1     Apr. 26, 2018

(51) Int. Cl.
| | |
|---|---|
| *B60W 30/16* | (2012.01) |
| *G01P 15/18* | (2013.01) |
| *G05D 1/00* | (2006.01) |
| *G01S 7/00* | (2006.01) |
| *G01S 7/497* | (2006.01) |
| *G05D 1/02* | (2006.01) |
| *G01P 21/00* | (2006.01) |
| *G01C 25/00* | (2006.01) |
| *G01S 7/48* | (2006.01) |
| *G01S 17/02* | (2006.01) |
| *G01S 17/89* | (2006.01) |

(52) U.S. Cl.
CPC ............ *G01S 7/4972* (2013.01); *B60W 30/16* (2013.01); *G01C 25/005* (2013.01); *G01P 15/18* (2013.01); *G01P 21/00* (2013.01); *G01S 7/4808* (2013.01); *G01S 17/023* (2013.01); *G05D 1/027* (2013.01); *G01S 17/89* (2013.01)

(58) Field of Classification Search
CPC ........ G01S 7/00; G01S 7/4808; G01S 7/4972; G01S 15/00; G01S 15/18; G01S 17/00; G01S 17/023; B60W 30/00; B60W 30/16; G01C 25/00; G01C 25/005; G05D 1/00; G05D 1/027
See application file for complete search history.

(56) References Cited

U.S. PATENT DOCUMENTS

| | | | | |
|---|---|---|---|---|
| 8,946,606 | B1* | 2/2015 | Dennison | G01C 21/20 244/3.1 |
| 9,423,509 | B2* | 8/2016 | Georgy | G01S 19/47 |
| 9,689,684 | B2* | 6/2017 | Sheard | G01C 19/025 |
| 10,260,862 | B2* | 4/2019 | Ramalingam | G01B 11/14 |
| 2005/0060093 | A1* | 3/2005 | Ford | G01C 21/165 701/472 |
| 2007/0242048 | A1* | 10/2007 | Yang | H01H 13/83 345/169 |
| 2007/0282589 | A1* | 12/2007 | Bershteyn | G06F 11/261 703/23 |

(Continued)

*Primary Examiner* — Yonel Beaulieu
(74) *Attorney, Agent, or Firm* — Lorenz & Kopf, LLP (57) ABSTRACT

Methods and systems are provided for aligning an inertial measurement unit (IMU) of a vehicle. In one embodiment, a system includes a sensor device configured to provide sensor data associated with an environment of the vehicle. The system further includes a sensor data processing module configured to process the sensor data to determine a ground plane and a vertical plane in the environment of the vehicle. The system further includes a correction module configured to determine at least one of a pitch and a roll alignment value based on the ground plane and the vertical plane.

18 Claims, 6 Drawing Sheets

(56) References Cited

U.S. PATENT DOCUMENTS

2013/0211713 A1\* 8/2013 Georgy ................... G01S 19/47
  701/468
2017/0124693 A1\* 5/2017 Ramalingam .......... G01B 11/14

\* cited by examiner

SYSTEMS AND METHODS FOR ALIGNING AN INERTIAL MEASUREMENT UNIT IN A VEHICLE

TECHNICAL FIELD

The present disclosure generally relates to autonomous vehicles, and more particularly relates to systems and methods for aligning an inertial measurement unit in an autonomous vehicle.

BACKGROUND

An autonomous vehicle is a vehicle that is capable of sensing its environment and navigating with little or no user input. An autonomous vehicle senses its environment using sensing devices such as inertial measurement units, radar, LIDAR, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Inertial measurement units (IMUs) are devices that use inertial sensors such as accelerometers and gyroscopes to measure how a body, or in this case the vehicle, moves. IMUs are a main component of inertial navigation systems and may measure force, rotational attributes such as pitch, roll, and yaw, to allow for the vehicle to navigate.

In order to obtain accurate information from the IMU, the IMU must be calibrated with respect to the vehicle and the environment surrounding the vehicle. In some instances the calibration is performed when the IMU is installed to the vehicle. Over time, the calibration may become inaccurate or "drift." Accordingly, it is desirable to provide systems and methods for aligning an IMU of a vehicle. It is further desirable to provide methods and system for aligning the IMU in realtime. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for aligning an inertial measurement unit (IMU) of a vehicle. In one embodiment, a system includes a sensor device configured to provide sensor data associated with an environment of the vehicle. The system further includes a sensor data processing module configured to process the sensor data to determine a ground plane and a vertical plane in the environment of the vehicle. The system further includes a correction module configured to determine at least one of a pitch and a roll alignment value based on the ground plane and the vertical plane.

In another embodiment, a method includes: receiving, by a processor, sensor data indicating an environment surrounding the vehicle; determining, by the processor, from the sensor data a vertical plane beside the vehicle; determining, by the processor, a vertical alignment from the vertical plane; determining, by the processor, an alignment value of the IMU based on the vertical alignment of the vertical plane; and communicating, by the processor, the alignment value of the IMU to the IMU for aligning the IMU.

BRIEF DESCRIPTION OF THE DRAWINGS

The above advantage and other advantages and features of the present disclosure will be apparent from the following detailed description of the preferred embodiments when taken in connection with the accompanying drawings.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments according to the present disclosure provide a number of advantages. For example, embodiments according to the present disclosure may enable independent validation of autonomous vehicle control commands to aid in diagnosis of software or hardware conditions in the primary control system. Embodiments according to the present disclosure may thus be more robust, increasing customer satisfaction.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
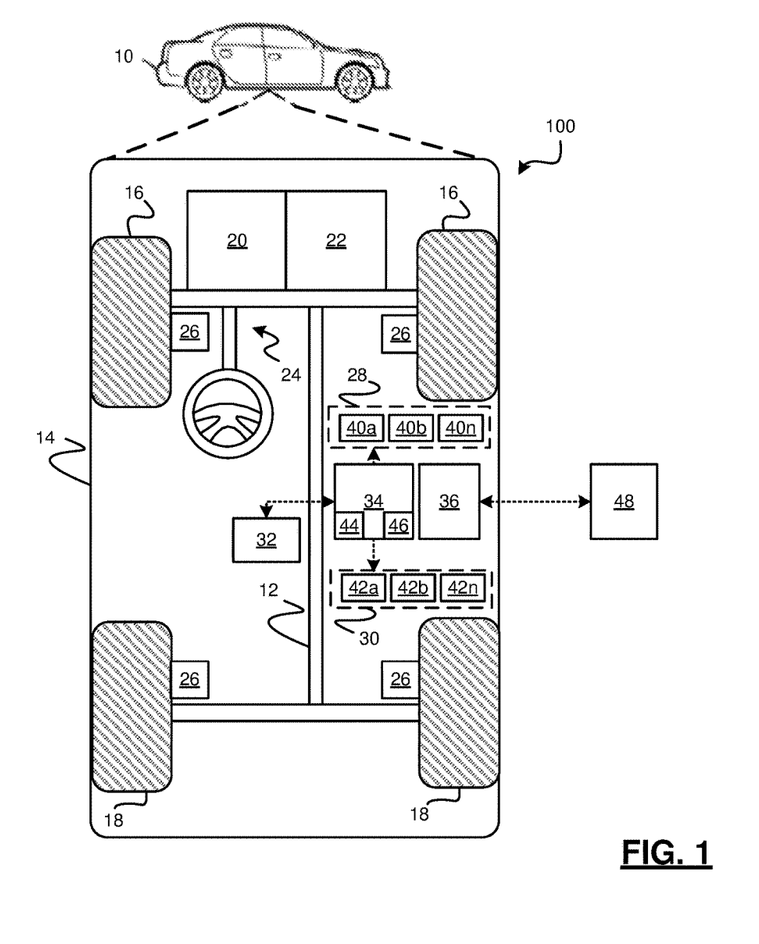
FIG. 1 is a functional block diagram illustrating an autonomous vehicle having an inertial measurement alignment system, in accordance with various embodiments.

With reference to FIG. 1, a system for aligning an IMU 40a of a vehicle 10 is shown generally at 100 and is associated with the vehicle 10 in accordance with various embodiments. The IMU 40a is configured to measure how the vehicle 10 moves using inertial sensors such as accelerometers and gyroscopes. For example, the IMU 40a measures rotational attributes such as pitch, roll, and yaw of the vehicle 10 using both angular and linear accelerometers. The IMU 40a may further include a gyroscope to maintain an absolute angular reference. The specific components and their configuration within the IMU 40a are otherwise known and not discussed herein.

The IMU 40a is part of a sensor system 28 associated with the vehicle 10. The sensor system includes one or more sensing devices 40a-40n. In general, the system 100 aligns the IMU 40a by estimating biases that are applied to a pitch and a roll associated with the IMU 40a. The system 100 estimates the biases based on readings from one or more other sensing devices 40b-40n of the sensor system 28.

For example, in various embodiments, the IMU 40a is rigidly mounted to the vehicle 10 such that the orientation of the IMU 40a is directly coupled to the vehicle's orientation. A bias angle is used to adjust a mounted angle of the IMU 40a to compensate for installation variability. The mounted angle refers to the physical relationship and orientation between the IMU 40a and the vehicle 10. When the IMU 40a is installed on the vehicle 10, the pitch, roll, and yaw axis of the IMU 40a may not exactly align with the physical directions on the vehicle 10. For example, the pitch axis of the vehicle 10 extends from one side of the vehicle 10 to the other and is generally parallel to the ground. Without biasing the IMU's 40a pitch angle, if the pitch axis of the IMU 40a was not installed in perfect alignment with the pitch axis of the vehicle 10, the IMU 40a would be out of alignment with the vehicle 10 and the information provided by the IMU 40a to the vehicle 10 would be inaccurate. Accordingly, bias angles are determined in realtime to compensate for this variability. In various embodiments, the bias angles are determined for pitch and roll.

Referring now to FIG. 1 in greater detail, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the system 100 and the IMU 40a is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes the IMU 40a and one or more other sensing devices 40b-40n that sense observable conditions of the exterior environment and/or the interior environment of the autonomous vehicle 10. The other sensing devices 40b-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
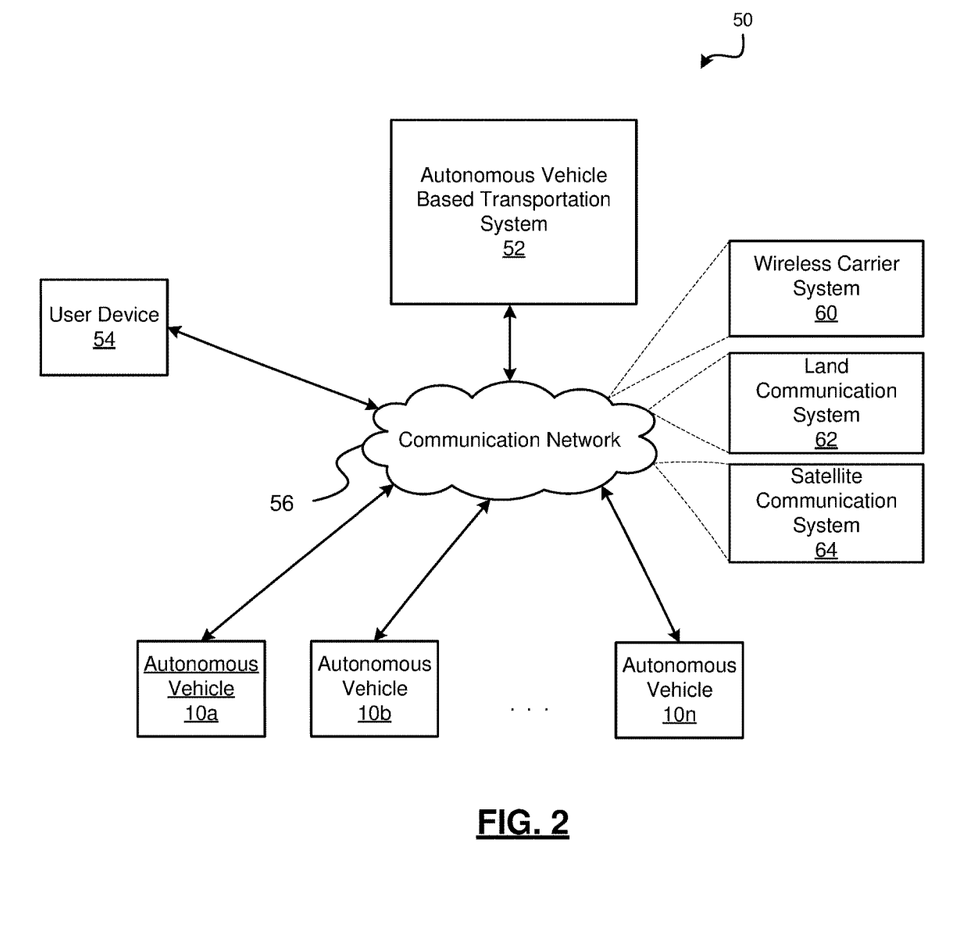
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the system 100 and, when executed by the processor 44, align the IMU 40a with the vehicle 10. For example, the instructions determine physical conditions surrounding the vehicle 10 such as the physical alignment of the environment and structures within the environment to determine the biases which, in turn, are used to align the IMU 40a in realtime. As discussed above, aligning the IMU 40a helps to ensure that the measurements being output by the IMU 40a are accurate.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10*a*-10*n* to schedule rides, dispatch autonomous vehicles 10*a*-10*n*, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10*a*-10*n* (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
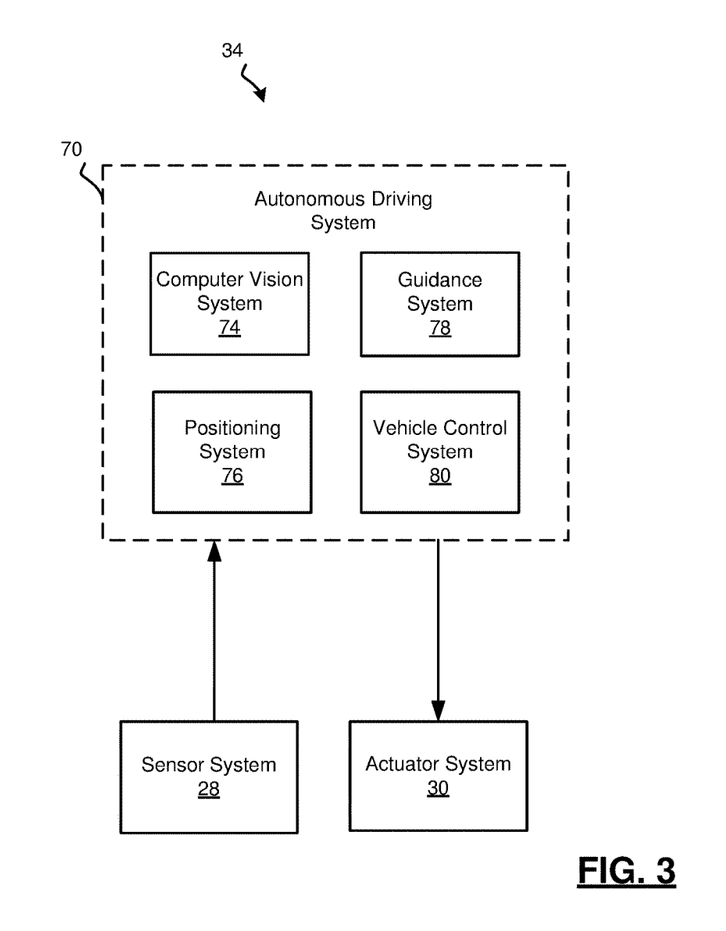
FIG. 3 is a functional block diagram illustrating an autonomous driving system, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, system 100 of FIG. 1 determines the biases that are used to align the IMU 40*a* with the vehicle 10. All or parts of the system 100 may be included within the positioning system 76, the guidance system 78, and/or the computer vision system 74.

Figure 4:
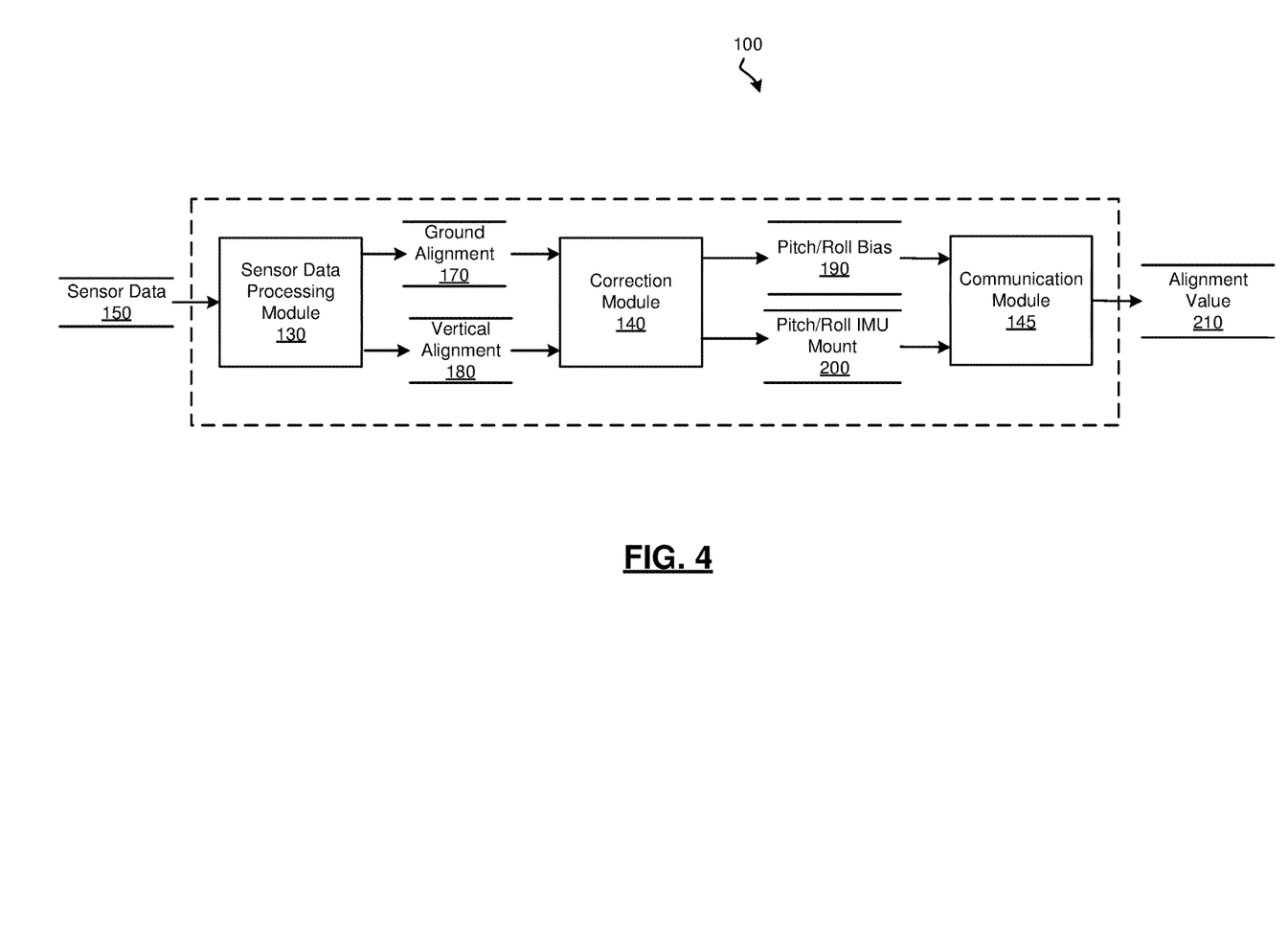
FIG. 4 is a diagram illustrating the inertial measurement alignment system, in accordance with various embodiments.

For example, as shown in more detail with regard to FIG. 4 and with continued reference to FIGS. 1-3, a non-limiting example of the system 100 may be incorporated into the ADS 70. It should be appreciated that the overall architecture, setup and operation, as well as the individual components of the illustrated system 100 are merely exemplary and that differently configured systems may also be utilized to implement the examples of the system 100 disclosed herein. Thus, the following paragraphs, which provide a brief overview of the illustrated system 100, are not intended to be limiting.

The system 100 generally includes a sensor data processing module 130 and a correction module 140. The sensor data processing module 130 receives sensor data 150 that has been obtained by scanning an environment surrounding the vehicle 10. The sensor data processing module 130 processes the sensor data 150 to determine a ground alignment 170 of a ground plane beneath the vehicle 10. The sensor data processing module 130 further processes the sensor data 150 to determine a vertical alignment 180 of a vertical plane beside the vehicle 10. For example, the vertical plane may be a facade of a building beside the roadway or another structure that is considered to be vertical.

Figure 5:
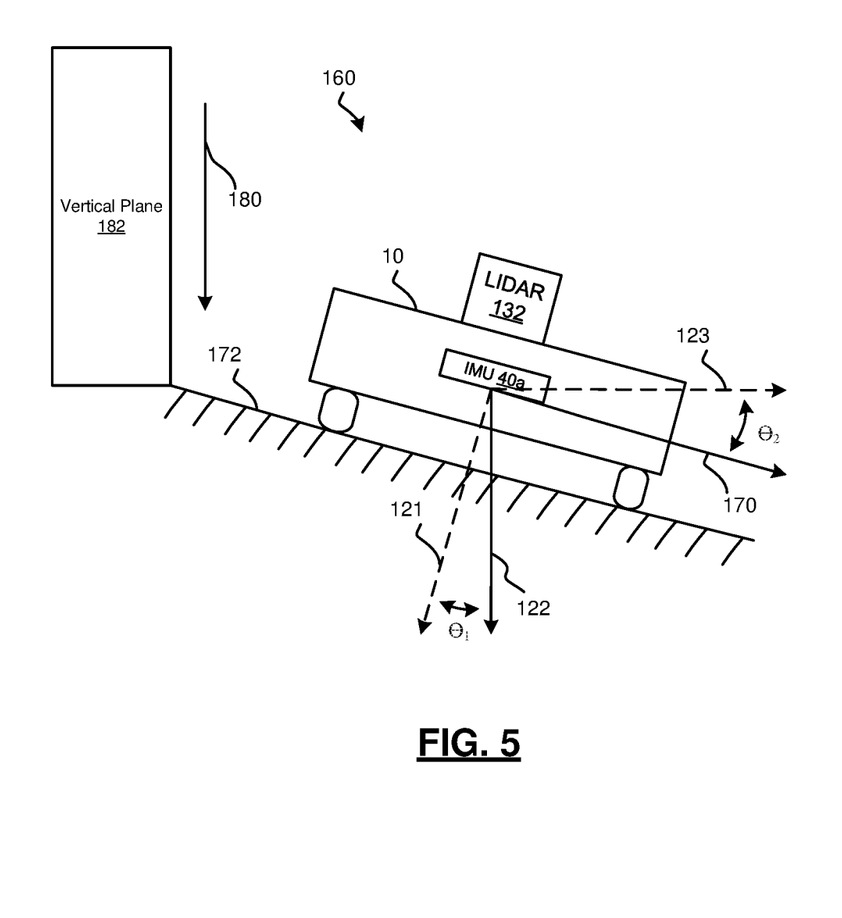
FIG. 5 is a diagram illustrating a non-limiting example of a vehicle and determined values, in accordance with various embodiments.

As shown in FIG. 5, the sensor data 150, in various embodiments, is LIDAR data received from a LIDAR sensor 132. While the LIDAR, sensor 132 is depicted herein on top of the vehicle 10, one skilled in the art will appreciate that this arrangement is for illustrative purposes and should not be interpreted as limiting with respect to the arrangement on the vehicle 10. While only one LIDAR sensor 132 is depicted herein, a plurality of sensor devices may be incorporated into the system 100 according to the type of sensor device used.

In various embodiments, the LIDAR sensor 132 transmits laser pulses throughout the environment 160 and measures the return pulses. The measurements are assembled into a point cloud of information including, but not limited to, values associated with distances and/or intensities. The point cloud is set to a top-down view grid image having a plurality of pixels. In various embodiments, the pixels in the image are then evaluated and grouped, for example, by computing a difference between a minimum Z value and a maximum Z value at each pixel, removing outlier pixels when there is a small difference, and grouping the neighborhood pixels. The data in the groupings is further evaluated to identify objects such as buildings, vehicles, and signs surrounding the roadway as well as to identify the ground itself and to identify a direction of the groupings.

For example, one or more of the groupings is selected as a vertical plane 182. Line features in the grouping are identified using, for example, the Hough-transform. The pitch and roll of the points related with line features in the groups are rotated in a predefined manner and the rotated points are set to a new top-down view grid image having a plurality of pixels. The number of pixels is compared to a minimum value. If the number of pixels has not reached a minimum, then the pitch and roll of the points related with the line features in the groups are rotated again in a predefined manner and the rotated points are set to a new top-down view grid image having a plurality of pixels. The number of pixels is again compared to the minimum. Once the number of pixels reaches the minimum, the global facade direction of the group is selected as the vertical alignment or direction 180. As can be appreciated, various methods may be employed to interpret the point cloud data, group the return points into objects, and identify the objects in various embodiments. For exemplary purposes a single method is provided herein.

In another example, one or more of the groupings is selected as a ground plane 172. For example, the point cloud data determined below the wheels is grouped. A Single Vale Decomposition (SVD) based plane equation is established and inlier points are calculated by using the SVD based plane equation. Thereafter, a Random sample consensus (RANSAC) based plane equation is used to evaluate the inlier points and establish a ground alignment or direction 170 of the ground plane 172

As can be appreciated, various methods may be employed to determine the alignments or directions in various embodiments and are not all described herein in detail.

With reference back to FIG. 4, the correction module 140 receives the ground alignment 170 and the vertical alignment 180 from the sensor data processing module 130. The correction module 140, then determines a pitch and/or roll bias 190 and a pitch and/or roll of the IMU mount 200 based on the ground alignment 170 and the vertical alignment 180.

For example, FIG. 5 illustrates an example when the vehicle 10 is stationary or substantially stationary in an exaggerated rolled position on the ground plane 172. In order to determine the roll bias 190, the correction module 140 sets V1 to a direction of gravity 121 measured by the IMU 40a and sets V2 to the vertical alignment 180 and aligns V1 and V2 using a Quaternion. For example, given:

$\Theta_1$=the dot product of (V1, V2), and axis=cross product (V1, V2), then a rotation matrix (3×3) M1 using Quaternion ($\Theta_1$, axis). As can be appreciated, the alignment can be performed based on other coordinate systems, such as, but not limited to Euler Coordinates system, and is not limited to the present examples. This rotation matrix M1 provides the roll bias 190, in this example. As can be appreciated, the same or similar methodology can be employed to determine the pitch bias 190 when the vehicle 10 is stationary or substantially stationary in a pitched position or other rotated position (not shown) on the ground plane 172. In other words, the roll, pitch, yaw and any other rotation of the vehicle 10 can be determined using the two vector alignment. For example, when the vehicle is stationary or substantially stationary in a rolled position and a pitched position on the ground plane 172, the rotation matrix M1 identifies both the roll bias and the pitch bias.

In another example, in order to determine the pitch and/or roll of the IMU mount 200 (the mount with respect to the vehicle 10 not illustrated in FIG. 5), the correction module 140 sets V3 to the perpendicular vector of the initial mounted car frame direction vector 121, and sets V4 to the normal vector 170 of the ground plane 172 and aligns the vectors V3 and V4 by the rotation matrix M1 and using a Quaternion. For example, given:

$V3' = M1 * V3$, $\Theta_2$=the dot product of (V3', V4), and axis=cross product (V3', V4), then a rotation matrix (3×3) M2 is defined using Quaternion ($\Theta_2$, axis). This rotation matrix M2 provides the pitch and/or roll of the IMU mount 200. As can be appreciated, the same or similar methodology can be employed to determine an angle of the IMU mount 200 depending on how the IMU is mounted to the vehicle 10 (not illustrated in FIG. 5). In other words, the roll, pitch, yaw and any other rotation of the IMU 40a can be determined using the rotation matrix M1 and the two vector alignment. For example, when the IMU 40a is mounted in a rolled position and a pitched position on the vehicle 10, the rotation matrix M2 identifies both the roll of the IMU mount and the pitch of the IMU mount.

With reference back to FIG. 4, the communication module 145 receives the pitch and/or roll bias 190 and the pitch and/or roll of the IMU mount 200 determined from the rotation matrices M1, M2 and determines an alignment value for the IMU 40a. For example, the communication module 145 and sets the alignment value 210 equal to the sum of the pitch and/or roll bias and the pitch and/or roll of the IMU mount. The communication module 145 then communicates the alignment value 210 back to the IMU 40a for updating and/or to other modules of the ADS 70 for use in controls and/or navigation functions.

Figure 6:
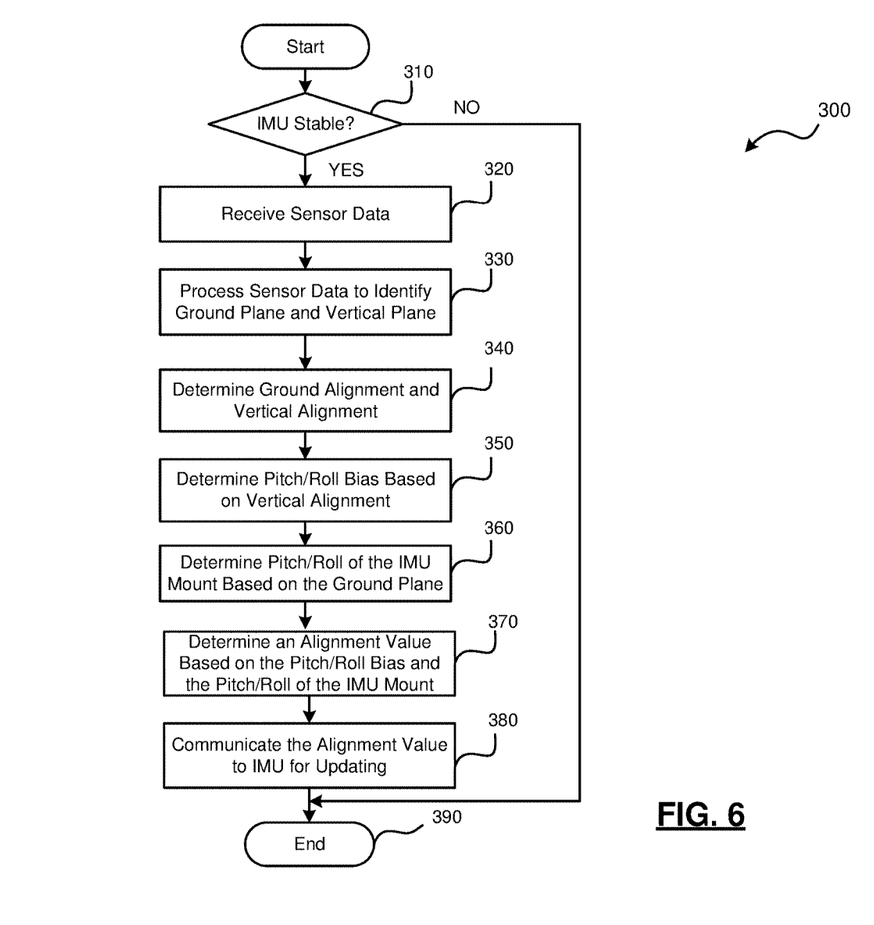
FIG. 6 is a flowchart illustrating a method for aligning the IMU of the vehicle in accordance with various embodiments.

Referring now to FIG. 6, and with continued reference to FIGS. 1-5, a flowchart illustrates a method 300 performed by the system 100 for aligning the IMU 40a of a vehicle 10, in accordance with the present disclosure. As can be appreciated in light of the disclosure, the order of operation within the method 300 is not limited to the sequential execution as illustrated in FIG. 6, but may be performed in one or more varying orders as applicable and in accordance with the requirements of a given application.

In various exemplary embodiments, the system 100 and method 300 are run based on an occurrence of predetermined events, and/or can run at scheduled times during operation of the vehicle 10. The method 300 may begin at 310 where IMU stabilization conditions are evaluated. If the IMU 40a is deemed unstable at 310, the method may end at 390. If, however, the IMU 40a is deemed stable (e.g., stable signal, vehicle speed below a threshold, etc.) at 310, the sensor data 150 including data points scanned from the environment surrounding the vehicle 10 is received at 320. The sensor data 150 is processed to identify the ground plane 172 beneath the vehicle 10 and the vertical plane 182 at 330, for example, as discussed above. The sensor data 150 is further processed to identify the ground alignment 170 and the vertical alignment 180 at 340, for example, as discussed above.

The vertical alignment 180 is then used to determine the pitch and/or roll bias 190 at 350, for example, as discussed above. The ground alignment 170 is then used to determine the pitch and/or roll of the mount 200 of the IMU 40a at 360, for example, as discussed above. The determined pitch/roll bias 190 and the pitch/roll of the mount 200 are used to compute an alignment value 210 at 370 and communicated to the IMU 40a for updating internal angle values of the IMU 40a at 380. Thereafter, the method may end at 390.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

The invention claimed is:

1. A system for aligning an inertial measurement unit (IMU) of a vehicle, comprising:
   a sensor device configured to provide sensor data associated with an environment of the vehicle;
   a sensor data processing module configured to process the sensor data to determine a ground plane and a vertical plane in the environment of the vehicle; and
   a correction module configured to, by a processor, determine at least one of a pitch and a roll alignment value based on the ground plane and the vertical plane,
   wherein the sensor data processing module is further configured to determine a ground alignment based on the ground plane, and determine a vertical alignment based on the vertical plane, and wherein the correction module is further configured to determine the at least one of the pitch and the roll alignment value based on the ground alignment and the vertical alignment.

2. The system of claim 1, wherein the sensor device is a light detection and ranging (LIDAR) sensor, and wherein the sensor data includes point cloud data.

3. The system of claim 1, wherein the at least one of the pitch and the roll alignment value is a vehicle bias value.

4. The system of claim 1, wherein the at least one of the pitch and the roll alignment value is a mount angle value.

5. The system of claim 1, wherein the sensor data processing module is further configured to determine whether the IMU is stable, and wherein the sensor data processing module is further configured to process the sensor data when the IMU is determined to be stable.

6. The system of claim 5, wherein the sensor data processing module is configured to determine whether the IMU is stable based on an evaluation of the IMU signal.

7. The system of claim 5, wherein the sensor data processing module is configured to determine whether the IMU is stable based on an evaluation of vehicle speed.

8. The system of claim 1, further comprising the IMU and wherein the IMU is configured to receive the at least one of the pitch and the roll alignment value and update stored values in the IMU based on the at least one of the pitch and the roll alignment value.

9. A vehicle, comprising:
   an inertial measurement unit (IMU);
   a sensor device configured to provide sensor data associated with an environment of the vehicle; and
   a controller configured to receive the sensor data, to process the sensor data to determine a ground plane and a vertical plane in the environment of the vehicle, and to determine at least one of a pitch and a roll alignment value based on the ground plane and the vertical plane, and to communicate the at least one of pitch and roll alignment value to the IMU,
   wherein the sensor data processing module is further configured to determine a ground alignment based on the ground plane, and determine a vertical alignment based on the vertical plane, and wherein the correction module is further configured to determine the at least one of the pitch and the roll alignment value based on the ground alignment and the vertical alignment.

10. A method of aligning an inertial measurement unit (IMU) of a vehicle, comprising:
   receiving, by a processor, sensor data indicating an environment surrounding the vehicle;
   determining, by the processor, from the sensor data a ground plane beneath the vehicle;
   determining, by the sensor device, a ground alignment from the ground plane;
   determining, by the processor, from the sensor data a vertical plane beside the vehicle;
   determining, by the processor, a vertical alignment from the vertical plane;
   determining, by the processor, an alignment value of the IMU based on the vertical alignment of the vertical plane and the ground alignment; and communicating, by the processor, the alignment value of the IMU to the IMU for aligning the IMU.

11. The method of claim 10, wherein the sensor data includes point cloud data.

12. The method of claim 11, wherein the point cloud data is lidar point cloud data.

13. The method of claim 10, further comprising determining whether the IMU is stable, and wherein the receiving the sensor data is performed when the IMU is determined to be stable.

14. The method of claim 13, wherein the determining whether the IMU is stable is based on an evaluation of IMU signals.

15. The method of claim 13, wherein the determining whether the IMU is stable is based on an evaluation of vehicle speed.

16. The method of claim 10, wherein the alignment value is a pitch value of the IMU.

17. The method of claim 10, wherein the alignment value is a roll value of the IMU.

18. The method of claim 10, wherein the alignment value is a mount angle of the IMU.

* * * * *